Jan. 7, 1936. T. PRATT 2,026,705
COMBUSTION ENGINE
Filed Nov. 21, 1931 5 Sheets-Sheet 1

INVENTOR
THEODORE PRATT
BY
ATTORNEY

Jan. 7, 1936.  T. PRATT  2,026,705
COMBUSTION ENGINE
Filed Nov. 21, 1931  5 Sheets-Sheet 2

INVENTOR
THEODORE PRATT
BY
ATTORNEY

Jan. 7, 1936.　　　　　T. PRATT　　　　　2,026,705
COMBUSTION ENGINE
Filed Nov. 21, 1931　　　5 Sheets-Sheet 3
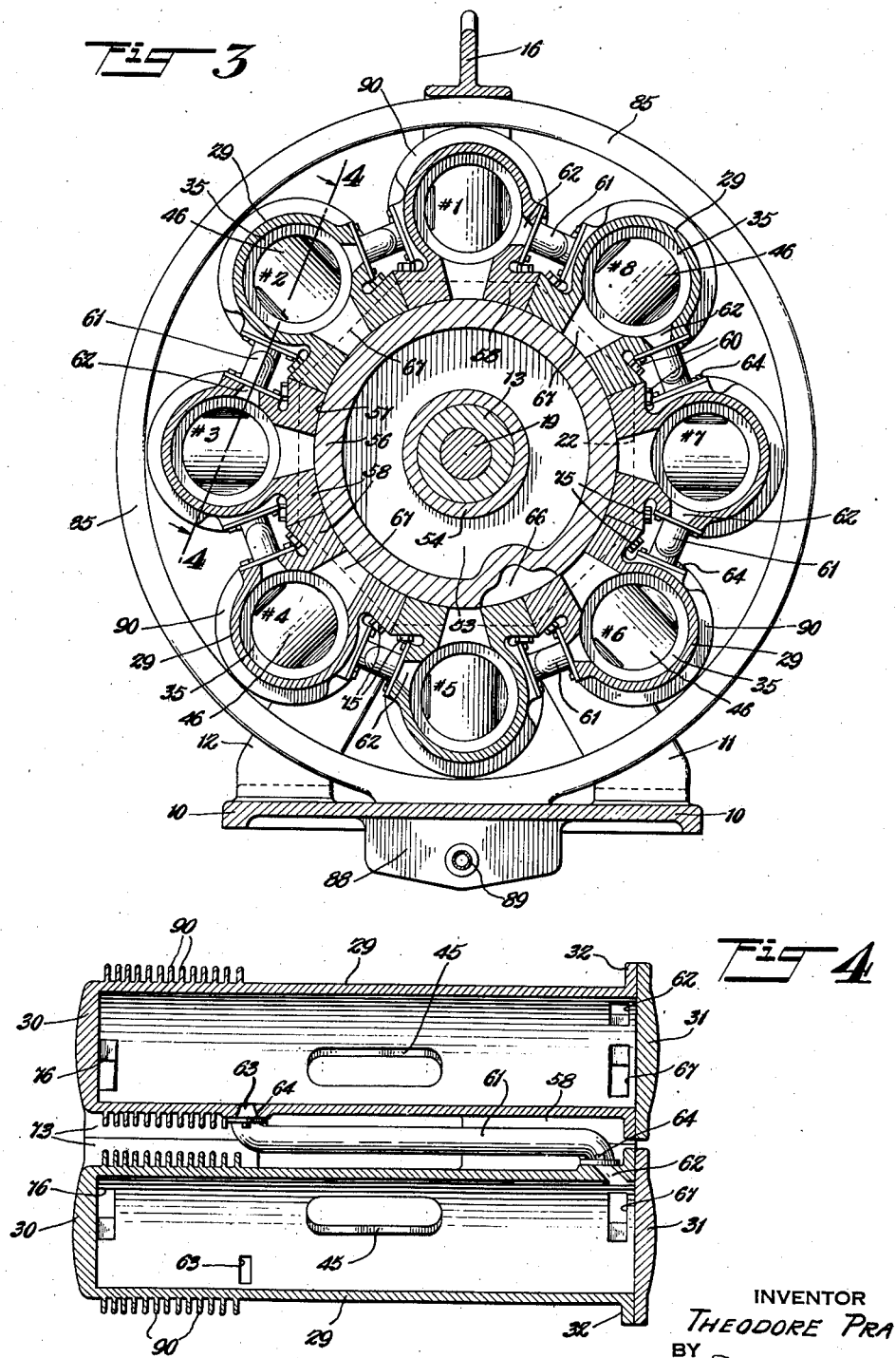
INVENTOR
THEODORE PRATT
BY
ATTORNEY

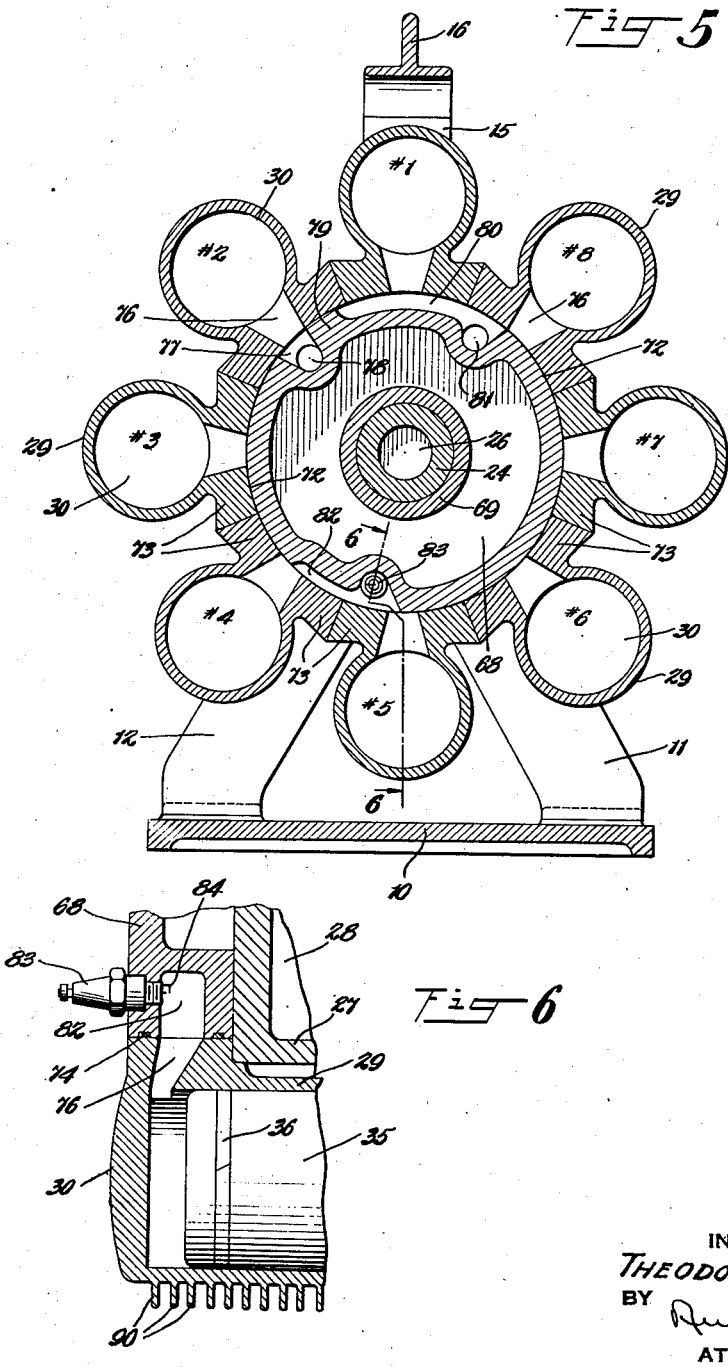

Jan. 7, 1936.   T. PRATT   2,026,705
COMBUSTION ENGINE
Filed Nov. 21, 1931   5 Sheets-Sheet 5

INVENTOR
THEODORE PRATT
BY
ATTORNEY

Patented Jan. 7, 1936

2,026,705

UNITED STATES PATENT OFFICE 2,026,705

COMBUSTION ENGINE

Theodore Pratt, Glen Cove, N. Y.

Application November 21, 1931, Serial No. 576,516

20 Claims. (Cl. 123—43)

This invention relates to combustion engines and more particularly to that form of engine known as the wabbler plate type.

This combustion engine comprises, generally a wabble plate which rotates on an angular axis fixed to the frame of the machine. The cylinders are preferably arranged about the wabbler plate in flywheel formation with the cylinders positioned around the rim of the flywheel. The cylinder flywheel rotates with the wabbler plate and is fixed to a drive shaft. The pistons within the cylinders are connected by means of suitable joints to the rim of the rotating wabbler plate.

Assuming that the cylinder wheel and wabbler plate have been given an initial rotation, then firing of the combustible gas within the cylinders tends to drive the piston against the rotating wabbler plate. Since the wabbler plate can only move in a fixed lateral path defined by the angular position of the shaft on which it rotates, the pistons cannot move the plate out of its fixed path. The result is that an equal and opposite reaction produced by the exploding gas is effected against the walls of the cylinder. The cylinder flywheel is arranged to rotate only. The forces derived from the exploding gases, therefore, act in an angular direction to one another and the explosion accordingly rotates the cylinder wheel in a direction away from the moving rim of the wabbler plate. In other words, an inclined plane effect is produced, the force (piston in this improved machine) which strikes the incline (wabbler plate) being changed in direction when it strikes the incline (wabbler plate) so as to move it (the piston in its cylinder) down the incline (in a rotative direction).

The improved engine herein includes suitable valve mechanism, comprising a stationary valve ring which is fixed to the frame and positioned within the cylinder wheel so that the cylinders themselves rotate around the valve ring. The valve ring is provided with a gas supply recess which is connected to a stationary carburetor. When the intake port of the cylinder rides in its rotative movement over the gas supply recess in the valve ring, combustible gas is drawn or forced into the cylinder. The new gas is mixed and somewhat compressed in one end of the cylinder by the reciprocating action of the piston. After mixing, the gas is transferred from the cylinder just mentioned to the firing end of one of the preceding cylinders, which in some instances may be the next adjacent cylinder in advance of the cylinder just mentioned. The piston in the advance cylinder opens and closes the intake port in the cylinder wall near the firing end, as the piston reciprocates. The spent gases at the firing end are discharged into an exhaust recess provided in the valve ring. This exhaust discharge takes place as the cylinders ride over the exhaust recess during the rotating movement of the cylinders. A firing recess is provided in the valve ring which contains flaming gases initially fired by a spark plug. These flaming gases ignite the gases in the cylinders as they pass over the firing recess in their rotative movement.

The improved combustion engine herein preferably is completely enclosed within the cylinder wheel and is thus fully protected. Once the engine has been given an initial rotation by a starting motor or other means, the combusting and expanding gases in the cylinders continue to drive the engine. With the use of several cylinders, and any number may be used, a rotating impulse is given to the cylinder wheel by each cylinder during one revolution so that the number of impulses given the machine during each revolution is equal to the number of cylinders provided. There is ample room around the cylinder wheel periphery for a large number of cylinders which will give a uniform rotating torque to the wheel.

With the cylinders positioned around the rim of the cylinder wheel, a flywheel action is obtained which further acts to steady and regulate the rotating torque. The cylinders can be made of heavy castings if found desirable to further increase the flywheel action and to accomplish a still more uniform power delivery. The engine may be constructed and adjusted to run at any desired speed, and it is estimated that speeds as high as 10,000 revolutions per minute or higher can be realized. This high speed makes the machine specially adapted for operating high speed generators and motor generator sets. It is to be understood, however, that there is no intention to limit this engine to this particular use alone, since it may be so regulated and designed as to adequately and efficiently satisfy all conditions where driving power is desired.

Moving parts have been reduced to the barest minimum, thus providing a substantially fool proof engine. Most of the parts thereof may be cast, wrought or stamped by mechanical methods and operations in general use so the engine may be readily produced and assembled with great accuracy and economy. Troublesome moving valve parts have been eliminated so that no power is lost in driving moving valve elements. More positive valve operation is attained by the improved structure herein described.

An object of this invention is to provide a combustion engine which has a steady torque and power delivery, and which can be efficiently and safely driven at speeds heretofore unattained in combustion engines.

Another object of the invention is to provide an improved combustion engine which has greater power for size and weight than combustion engines heretofore constructed.

Still another object of this invention is to provide an engine having valves which are positive in operation, which have no moving parts or elements which consume power in their operation, and which will effectively and efficiently deliver new gas and remove spent gas in complete synchronism with the driving parts of the engine.

Another object of the invention is to provide an efficient, economical and effective method of transferring combustible gases and exhaust gases to and from the operating cylinders of combustion engines.

Another object of this invention is to provide a combustion engine having an ignition system operating in complete synchronism with the speed of the machine and without the use of "timed" ignition.

A further object of this invention is to provide a combustion engine which can be made by machine operation on a production basis from cast, wrought or stamped parts, which engine can be manufactured by known mechanical operations from which the human element is largely eliminated, which is furthermore very economical to manufacture, substantially fool proof in operation, which has few parts which require adjustment, and is free from many of the "temperamental" features of combustion engines heretofore made, which is rugged and sturdy in construction, economical in space and fuel consumption, light in weight per unit of power, and which can be easily transferred or moved about.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical cross sectional view taken longitudinally through the engine and showing more particularly the engine frame, cylinder, piston and wabbler plate construction, and the means for mounting the same;

Fig. 3 is a vertical cross sectional view taken transversely of the engine on line 3—3 of Fig. 1, showing more particularly the intake ports and the method of transferring the new gas from the valve ring to the mixing end of one cylinder and from thence to the firing end of the adjacent advance cylinder;

Fig. 4 is a cross sectional view through two adjacent cylinders taken on line 4—4 of Fig. 3, this view showing in more detail the connection by which the new gases are transferred from the mixing end of one cylinder to the firing end of the adjacent advance cylinder;

Fig. 5 is a vertical cross sectional view taken transversely of the engine on line 5—5 of Fig. 1, this view showing more particularly the means used for firing the cylinder and the means for removing the exhaust gases from the firing end;

Fig. 6 is an enlarged cross sectional view through a fragmentary portion of the valve ring at the firing point and an adjacent cylinder, taken on line 6—6 of Fig. 5, this view illustrating more particularly how the burning gases in the firing recess fired by the spark plug pass into the firing end of the cylinder to explode the compressed gas therein;

Figure 7:
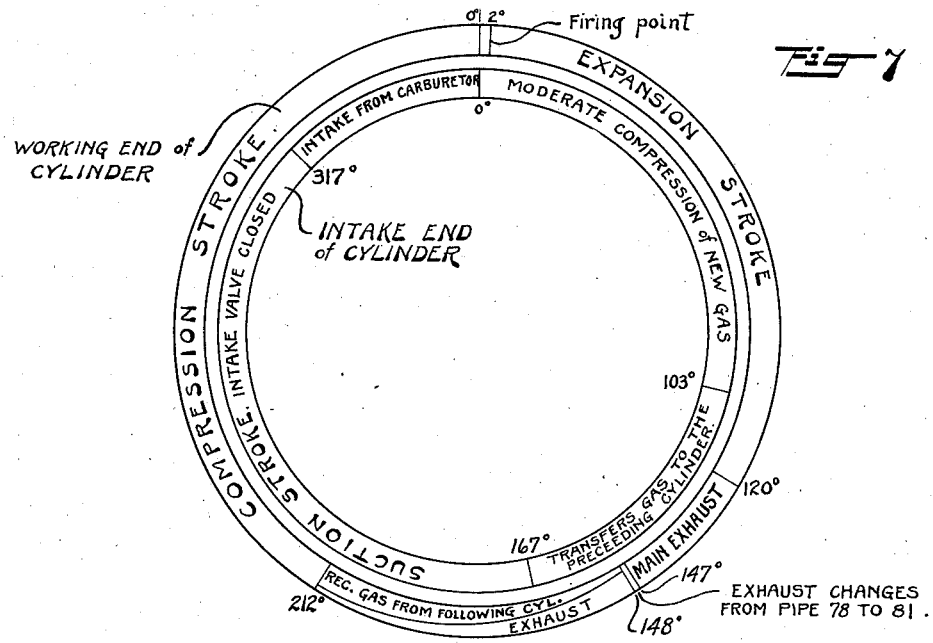
Figure 8:
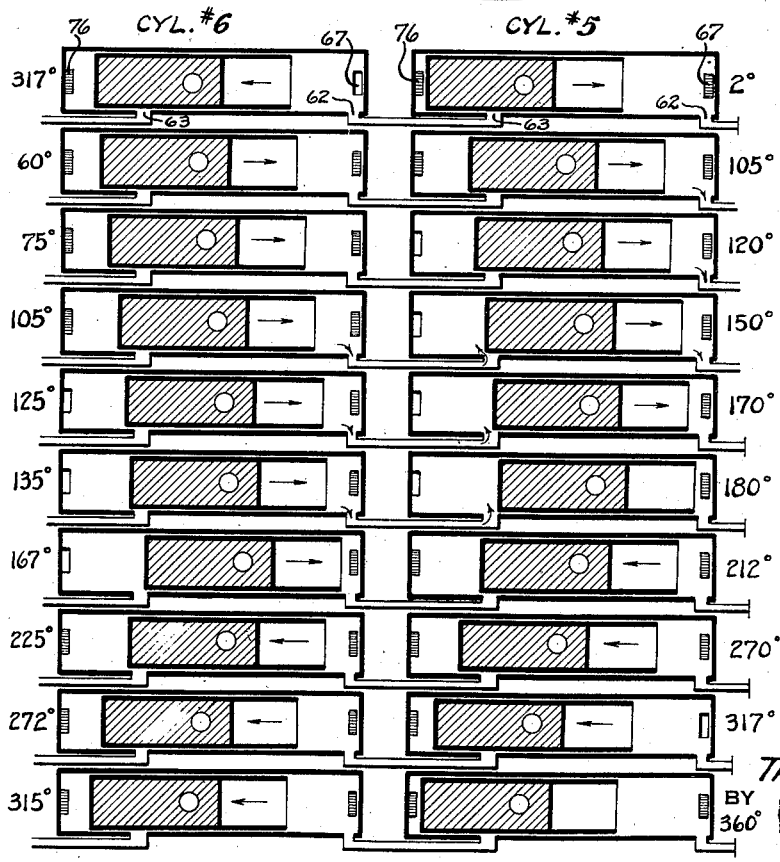

Fig. 7 is a diagram which illustrates the various transformations and operations which take place at the working end and mixing ends of a cylinder at various stages during a complete revolution; and Fig. 8 is a diagrammatic view of two adjacent cylinders showing the relative positions of the pistons and the intake and exhaust valves at certain fixed positions during one complete revolution of the two cylinders.

Like reference characters denote like parts in the several figures of the drawings.

The internal combustion engine is shown in the drawings as mounted on a base plate 10 having inverted Y-shaped standards 11 and 12 at each end thereof. Hub portions 13 and 14 at each end of the machine are cast integral with the Y-shaped standards 11 and 12. The stem portion 15 of the standard, cast integral therewith, extends above the hub portions 13 and 14. A yoke member 16 extends over the top of the engine and is secured to the stem portion 15 of each standard. It is understood that the structure is not limited to this specific form of mounting, but may be modified to suit requirements.

There is shown in the drawings a cylinder wheel having eight cylinders disposed around the periphery thereof, the cylinders being numbered counterclockwise as #1, #2, #3, #4, #5, #6, #7, and #8. The cylinders are supported at each end by the discs or drums 17 and 17a. The drum 17, supporting the mixing end of the cylinder, is provided with a suitable journal 18 which rotates on the wabbler shaft 19. The wabbler shaft 19 is stationary and is secured to the hub portion 13 of the frame in any suitable manner as by machine bolts 20 which extend through a flange portion 21 provided on the end of the shaft 19, and into the hub portion 13 of the frame. The outer periphery of the drum member 17 is provided with an inturned flange 22 which is eight sided or octagonal in shape, each side providing a support for a cylinder. If more than eight cylinders are used the rim portion of the member 17 would be shaped accordingly to provide the necessary number of cylinder seats and to give the requisite strength to the drum. The drum may be provided with a number of reinforcing webs 23 which radiate from the journal 18 to the rim flanges 22. The entire drum member 17 may be cast or forged in one integral piece.

The drum member 17a supports the firing end of the cylinder (as shown) and is provided with a journal portion 24 to which the drive shaft 25 of the machine may be attached or integrally formed therewith, as found desirable. The inner end of the journal 24 is provided with a socket or recess 26 into which one end of the wabbler shaft 19 extends. The wabbler shaft is stationary and fixed to the frame of the machine as heretofore noted and the socket 26 in the journal portion 24 supports the inner end of the wabbler shaft. Drum member 17a is otherwise constructed substantially similar to the drum member 17 and is provided with an inwardly extending flange 27 of octagonal or other shape with web portions 28 radiating from the journal portion 24 to the flange 27 to give the requisite strength to the drum member.

Figure 1:
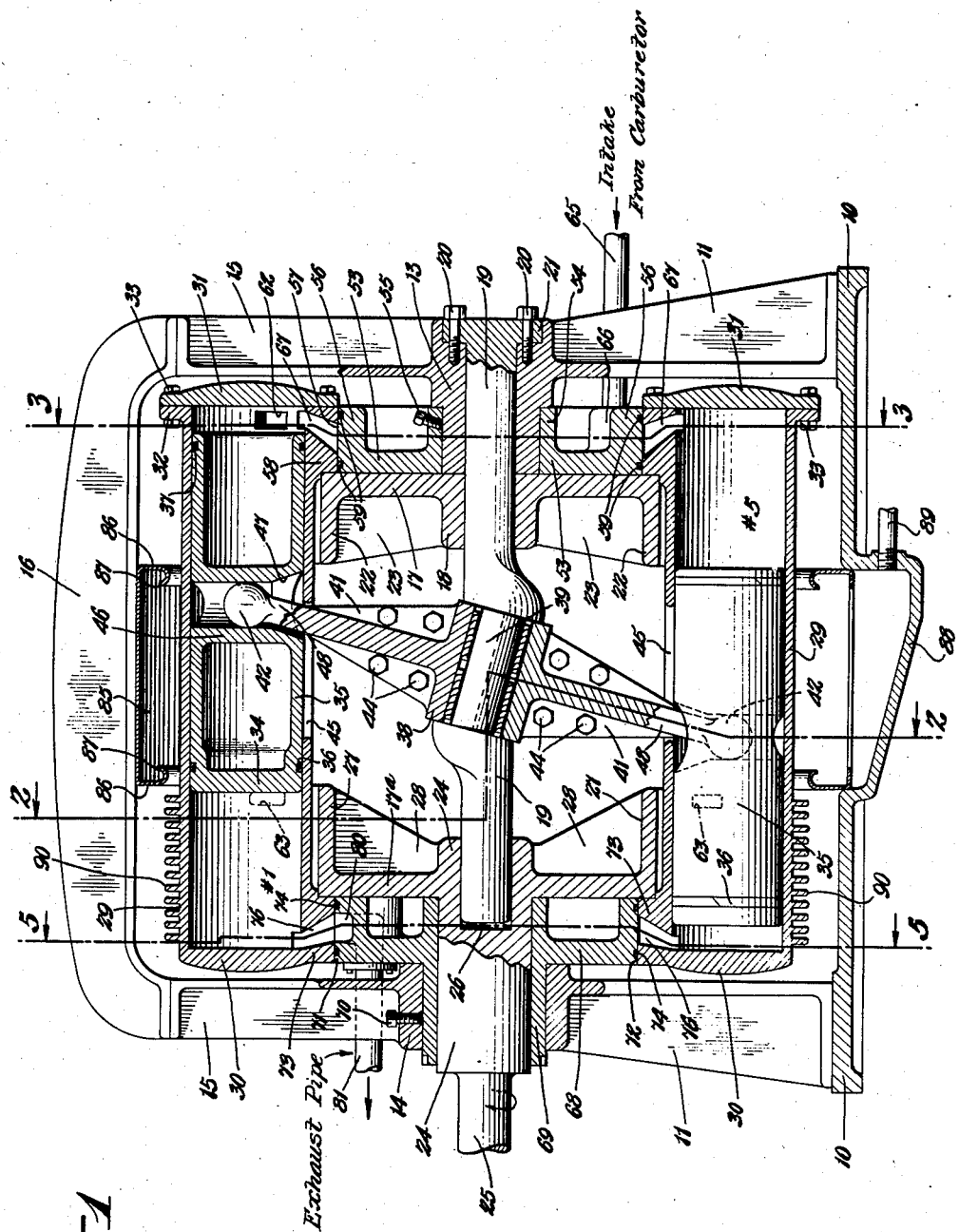

The side wall or barrel portion 29 and the head portion 30 of each cylinder may be cast integrally. The open end of the cylinder may be closed by a cap member 31 secured to the outwardly extending flange 32 of the barrel portion 29 by bolts 33. The engine is designed as a two cycle type, the mixing of the gases taking place in one end of the cylinder and fired in the other. The piston 35 as clearly shown in Fig. 1 is of conventional design with necessary piston rings 36 and 37 at each end of same. The piston head has been numbered 34 in order to more clearly differentiate same from the body portion.

The wabbler plate bears considerable strain and should therefore be strongly constructed. The hub portion 38 of the wabbler plate is journalled on the angular portion 39 of the wabbler plate shaft. The frictional losses at this bearing should be reduced to a minimum in order to effect efficient operation of the machine.

Figure 2:
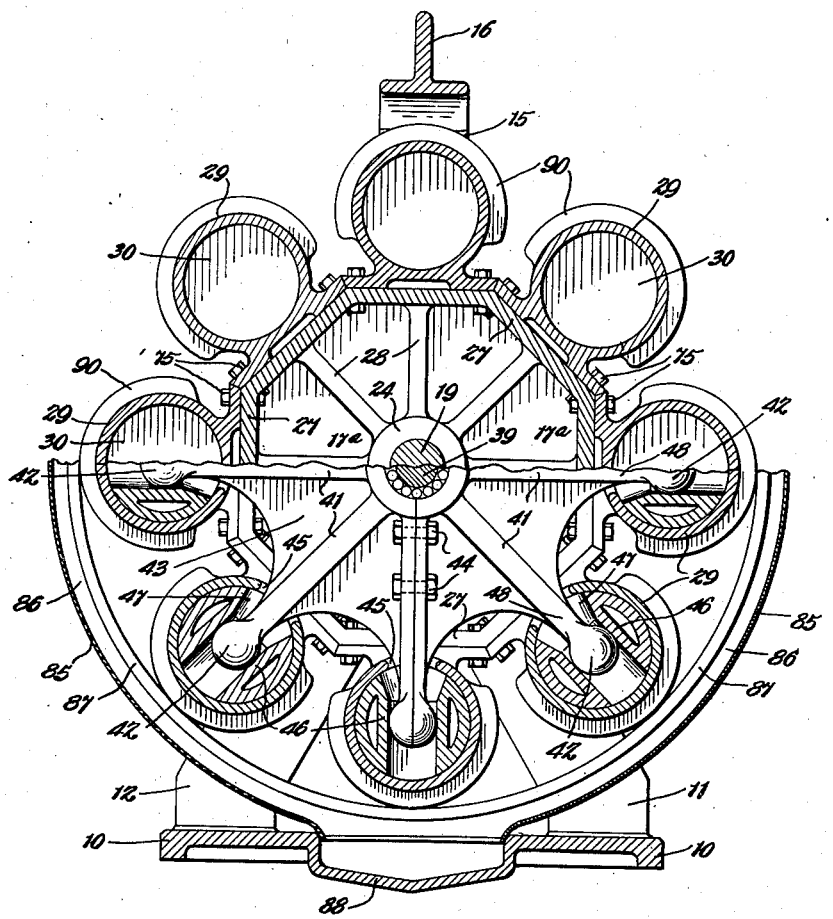
Fig. 2 is a vertical cross sectional view taken transversely through the engine on line 2—2 of Fig. 1, showing in further detail the construction of the cylinders and pistons, the face view of the wabbler plate and the general interior end view of the cylinder wheel and cylinders.

Spoke members 41 radiate from the hub portion 38 and terminate in a suitable flexible joint element, such as a ball 42. A spoke member for each cylinder is provided. The spokes are preferably joined by a strong connecting web 43, as shown more particularly in Fig. 2, which greatly strengthens the wabbler plate. In order to apply the wabbler plate to the angular shaft portion 39, it may be necessary to cast or forge the same in two halves, as shown in Figs. 1 and 2, and these halves may then be secured together in any suitable manner as by bolts 44. It is now seen that as the wabbler plate revolves on the angular shaft portion 39, the joint elements or balls 42 will move in a lineal direction depending upon the tilt of the angular portion 39 of the shaft 19.

Each ball 42 extends through a suitable slot 45 cut through the cylinder wall. The slot 45 is of sufficient length to permit full lineal movement of the wabbler plate. The piston may be provided with a barrel shaped socket 46 in which the ball portion 42 of the wabbler plate is adapted to seat.

The wabbler plate rotates by reason of the operation of the engine and also moves in a lineal direction with the pistons. The ball and socket connection between the wabbler plate and pistons permit the necessary play between the members to prevent binding. The socket portion 46 may be flared outwardly as at 47 to provide the necessary space for the movement of the neck portion 48 of the wabbler plate.

The outwardly extending flange portion 56 of the intake valve ring provides an outer rim which is preferably machined to closely fit the inner arcuate surfaces 57 of the intake blocks 58 cast integral with the cylinders at the intake end thereof.

Two stationary valve rings are provided, one at each end of the cylinder. The intake valve ring 53, as shown in Figs. 1 and 3, is provided with a hub portion 54 secured to the hub portion 13 of the frame by a key bolt 55 or other well known means.

As will be noted by referring to Fig. 3, the intake blocks 58 are so shaped as to fit snugly against one another and forming in effect the segments of a continuous inside rim which rotates over the intake ring 53. The rim portion 56 of the intake ring may be provided with a pair of metal gaskets 59 which furnish a tight fit between the intake rim 56 and the intake blocks 58. Each cylinder and intake block thereof may be secured to the inturned flange 22 of the cylinder wheel 17 by means of machine bolts 60, or otherwise.

As shown more particularly in Figs. 3 and 4, the cylinders are connected together by a transfer pipe 61. The purpose of this pipe is to transfer the new gases from the mixing end of one cylinder to the firing end of another cylinder. As shown in the drawings, new gases are transferred from one cylinder to the next adjacent cylinder. However, I do not limit myself to this particular arrangement, but contemplate transferring the gases from one cylinder to any other cylinder, depending upon conditions. As shown in Figs. 3 and 4, a new gas outlet port 62 is provided in each cylinder at the mixing end thereof. The transfer pipe 61 leads to a new gas supply port 63 in the side wall of a preceding cylinder. The transfer pipe 61 can be secured to the respective outlets and supply ports of each cylinder by machine bolts 64 in such a manner as to prevent any loss of gases. The piston 35 operates to open and close the supply port 63 so as to admit at predetermined intervals the new gases to the firing end of each cylinder. The opening and closing of the supply port by the piston, which is synchronized with other operations performed by the engine, will be described more in detail hereinafter.

The new gases are supplied to the engine from a carburetor or other supply means which is not shown in the drawings. A supply pipe 65 leads from the carburetor to an intake pocket 66 provided in the intake ring 56. The gases in this pocket are transferred to the mixing end of the respective cylinders as each rides thereover, transfer taking place through a port 67 provided in each cylinder, as shown more particularly in Fig. 1. The gases in pocket 66 will transfer quickly into the mixing end of each cylinder during the momentary interval when the port 67 of each cylinder is in open contact with the gas pocket 66 of the intake ring. The movement of the gases and the particular operation of the respective gas ports will be described more in detail hereinafter.

The exhaust valve ring 68 is provided with a hub portion 69 which is secured to the hub portion 14 of the frame by means of a stud bolt 70. The exhaust ring is thus held stationary. The exhaust ring is provided with a flange portion 71 which forms an outer rim. This rim 71 is machined to closely fit the inner arcuate surfaces 72 of the exhaust blocks 73, which are cast integral with each cylinder, as shown more particularly in Fig. 5. The exhaust blocks 73 each form in effect a segment of a continuous rim which surrounds and closely fits the rim 71 of the exhaust ring. Gaskets 74 may be provided to obtain a tight fit between the rim of the exhaust ring and the segments 73 of the cylinders. The segments 73 and the cylinders may be held in place by machine bolts 75 which extend through each segment and into the flange portion 27 of the drum member 17a.

Each cylinder is provided with an exhaust port 76 positioned at the head end thereof. As the cylinders revolve about the exhaust ring 68, each exhaust port 76 in turn passes over a primary exhaust recess 77, as shown more particularly in Figs. 1 and 5. The operation of the engine is such that the exhaust port 76 of each cylinder passes over the exhaust recess 77 when the piston is approaching the lower end of its stroke and before the opening of the intake port 63. Most of the exhaust gases are removed through the primary exhaust recess 77 and the primary exhaust pipe 78.

A wall portion 79 in the exhaust frame separates the primary exhaust recess 77 from the secondary exhaust recess 80 (Fig. 5). The exhaust port 76 of each cylinder begins its passage over the secondary exhaust recess 80 when the intake port 63 opens by the passage of the piston head 34 past the same. The location of port 63 may be such that the incoming new gases will force out the spent gases. Under these circumstances, port 63 is preferably positioned in such location circumferentially of the valve ring that mixing of the fresh gases with the spent gases will be eliminated as far as possible and the greatest efficiency in the intake of new gases and the clearing of the spent gases from the cylinder will be realized. The exhaust pressure in the firing end of the cylinder has then been so reduced that the pressure of the new gas as it enters the firing end of the cylinder is greater than the pressure of the exhaust gas. Consequently, exhaust gases pass out into the secondary exhaust recess 80 and from there out through the secondary exhaust pipe 81. It will be noted by referring to Fig. 1 of the drawings that the new gases enter near the bottom of the firing end of the cylinder and form a cushion immediately on top of the piston head 34, which when the piston moves forward drives the exhaust gas out through the exhaust port 76, the secondary exhaust recess 80 and the secondary exhaust pipe 81.

Spaced from the primary and secondary exhaust ports 77 and 80, a firing recess 82 is provided in the exhaust ring, as shown more particularly in Figs. 5 and 6. A spark plug 83 is secured to the exhaust ring 68 in such a manner that the spark gap terminals 84 extend into the firing recess 82. As the firing end of each cylinder rides over the firing recess 82, the new gas under compression in the firing end thereof shoots into the firing recess 82 and is fired by the spark passing between the terminals 84 of the spark plug. The gases thus fired in turn fire the compressed gases remaining in the cylinder which then react against the piston. It will be noted by referring to Fig. 5 that the firing recess 82 is of such length that the exhaust ports 76 of two cylinders are positioned over the firing recess 82 at the one time. This occurs at the time when a fired cylinder, whose gases are aflame, is moving out of contact with the firing recess and another cylinder is beginning its journey across the firing recess. The flaming gases in the cylinder just fired will then shoot through the firing recess 82 and through the exhaust port 76 of the following cylinder, and in turn fire the new gases therein. With this arrangement, the spark plug 83 need only be used for initial firing and from then on the cylinders fire each other in turn without the use of any independent firing means. Timed ignition is thus eliminated.

Any suitable oiling means may be provided. In a rotary engine of this type, however, it is generally considered preferable to inject the lubricating oil near or through the drive shaft or wabbler shaft of the engine. Lubricating oil may also be mixed with the fuel oil. The lubricating oil is permitted to circulate within the cylinder wheel and into the barrel shaped socket 46 of the piston end to lubricate the piston end and wabbler plate connection. An oil receiving pan 85 may be provided to catch the oil after it has circulated through the engine and around the cylinders. Flanges 86 having inturned edges 87 may be provided to prevent escape of the oil from the pan. The pan may surround the cylinders as shown in Fig. 3, and terminate in an oil receiving receptacle 88, which may be cast integral with the base 10. The oil which collects in the receptacle 88 may be led off through pipe 89. Radiating fins 90, as shown in Figs. 1 and 3, may also be provided on each cylinder to assist in cooling the cylinders and piston.

The operation of the engine will now be studied in connection with the diagram shown in Figs. 7 and 8. It will be assumed that the cylinders rotate in clockwise direction and cylinders 5 and 6 (shown in Fig. 5) will be considered. In the position shown in Fig. 5 cylinder 5 rotating clockwise is fired by the flaming gases in the firing pocket 82. The piston of cylinder 5 is then in the position shown in Fig. 8 at 2°. The spent gas exhaust port 76 is then closed at the firing end of the cylinder and the new gas transmission port 67 is also closed. The piston in cylinder 5 in the 2° position also maintains the new gas intake port 63 to the cylinder closed. At this point cylinder 6 is in the 317° position, as shown in Fig. 8, with spent gas exhaust port 76 closed and new gas intake port 67 open. In other words new gas from the carburetor is being received into the mixing end of cylinder 6 as is evident by referring to the diagram shown in Fig. 7. The piston in cylinder 5 continues on its expansion stroke and at the 105° position new gas moves from the mixing end of cylinder 5 to the firing end of the preceding cylinder 4.

At the 120° position cylinder 5 has reached the primary exhaust recess and most of the spent gases and pressure of same are exhausted through the port 76. At the 150° position new gas is still being discharged from the mixing end of cylinder 5. At the 150° position, the piston has begun to pass beyond the port opening 63 in the cylinder wall and new gas begins to flow from the following cylinder 6 into the preceding cylinder 5, as shown in the diagram. New gas is still discharging from the mixing end of cylinder 5 and the exhaust port 76 is in contact with the secondary exhaust recess 80. At the 170° position new gas no longer flows out of outlet port 62 at the mixing end of cylinder 5 since the piston in the preceding cylinder 4 has closed its port. Exhaust port 76 of cylinder 5, however, still remains open. At the 180° position cylinder 5 has completed a one-half revolution and the piston therein is about to return on its compression stroke. New gas continues to flow therein and the spent gases are forced out through port 76 by the pressure exerted by the inflowing new gases. At the 212° position the piston in cylinder 5 has begun its compression stroke and has closed the gas supply port 63 so that no more new gas flows into the firing end of the cylinder. The exhaust port 76 is also closed at this point. At the 270° position compression of the gases in the firing end of cylinder 5 is being continued with spent gas exhaust port 76 and new gas supply port 63 both closed. The supply port 67 in the 317° position has reached the new gas intake pocket 66 (Fig. 1) and new gas is drawn into the mixing end of cylinder 5 by the partial vacuum therein. At the 360° position compression in cylinder 5 has been completed and firing is about to take place. New gas supply port 67 in the mixing end of the cylinder is then closed. The cycle above described is then repeated.

Referring to cylinder 5 at its 180° position, it will be seen that the piston has practically no movement as it is finishing one stroke and beginning the stroke in the reverse direction. While the piston in cylinder 5 is passing through this part of its cycle, more gas is being fed into the cylinder as the piston of cylinder 6 is still moving toward the end of its stroke and therefore forcing more of the mixed fuel into cylinder 5. Thus the cylinder 5 may be said to be supercharged as the exhaust port has been closed.

It will be noted that when eight cylinders are used, each cylinder is spaced 45° apart. The comparative position of the cylinders is made clear by referring to the diagram shown in Fig. 8 where the cylinders are shown as spaced 45° apart.

A change in the number of cylinders, of course, would make necessary changes in the various ports or exhaust and intake recesses. Furthermore, the various degree positions shown in Figs. 7 and 8 are merely for the purpose of explanation. The length of the exhaust and intake recesses will be influenced somewhat by the speed at which the machine is to be driven and the R. P. M. of the machine will also influence the length of time the ports are to be kept open.

While certain novel features of the invention have been disclosed and are pointed out in the annexed claims, it will be understood that various omissions, substitutions and changes may be made by those skilled in the art without departing from the spirit of the invention.

What is claimed is:

1. A combustion engine including in combination, a rotatable wabbler plate, a wheel member having cylinders arranged around the periphery thereof, pistons within said cylinders operatively connected to said wabbler plate, and means including a stationary valve ring for conducting combustible gas to the mixing end of cylinders and to pass from there to the firing ends of others of said cylinders and a stationary valve ring for conducting spent gas from the firing end thereof.

2. A combustion engine including in combination, a rotatable wheel member having a series of cylinders arranged around the periphery thereof, and a pair of stationary valve rings fitted within said wheel but not in engagement with each other, one of said valve rings having a gas recess and another having an exhaust gas recess adapted respectively to deliver fresh gas into and to receive spent gas from said cylinders as said cylinders pass consecutively thereover.

3. A combustion engine including in combination, a rotatable wheel member having a series of cylinders arranged around the periphery thereof, and stationary valve rings fitted within said wheel but not in engagement with each other, one of said valve rings having a gas port, and another valve ring having a gas firing portion and an exhaust port adapted respectively to supply fresh gas to each cylinder, fire the gas in each cylinder, and receive the spent gas from each cylinder as each cylinder passes consecutively thereover.

4. A combustion engine, including in combination, a plurality of rotating cylinders, a piston in each of said cylinders and adapted to reciprocate therein, means for delivering combustible material into one of said cylinders where it is mixed by the action of the piston therein, means for transferring substantially all of the mixed material from the cylinder last mentioned to another predetermined cylinder and to place the transferred mixed material under pressure before the transferring is stopped, and means for firing said mixed material in the cylinder last mentioned to drive the piston therein.

5. A combustion engine of the character described, including in combination, a series of rotating cylinders each having a mixing end and a firing end, a piston in each of said cylinders adapted to reciprocate therein, means for delivering combustible material into the mixing end of each of said cylinders where it is mixed by the action of the piston therein, means for transferring substantially all of the mixed material from the mixing end of each cylinder to the firing end of a predetermined advanced cylinder and to place the transferred, mixed material under pressure before the transferring is stopped, and means for firing successively the mixed material as each cylinder passes a predetermined point.

6. A combustion engine including in combination, a rotatable wheel member having a series of cylinders arranged around the periphery thereof, and a stationary valve ring fitted within said wheel, said valve ring having a gas receiving recess therein adapted to supply combustible gas to said cylinders as they pass thereover, a second valve ring having a firing recess therein, said firing recess containing a continuous firing medium adapted to ignite the new gases in each cylinder as each cylinder passes successively over said firing recess.

7. A combustion engine including in combination, a rotatable wheel member having a series of cylinders arranged around the periphery thereof, and a stationary valve ring fitted within said wheel, said valve ring having a gas receiving recess therein adapted to supply combustible gas to said cylinders as they pass thereover, a second valve ring having a firing recess therein, firing means in said firing recess for originally igniting a continuous firing medium in said recess which in turn ignites the gases in each cylinder as they pass successively over the same.

8. A combustion engine including in combination, a rotatable wheel member having a series of cylinders arranged around the periphery thereof, and stationary valve rings fitted within said wheel, one of said valve rings having a gas port adapted to supply fresh gas to the cylinders, and another valve ring having an exhaust gas port and a firing recess therein, firing means adapted to ignite a continuous firing medium in said recess, said firing medium in the recess and exhaust port being arranged to fire the gas in each cylinder and to receive the spent gas from each cylinder as each cylinder passes consecutively over said recess and exhaust port during rotation of said wheel.

9. A combustion engine including in combination, a rotatable wheel member having a series of cylinders arranged around the periphery thereof, stationary rings positioned to engage the ends of said cylinders, a gas port adapted to supply fresh gas to the cylinders, a continuous firing means adapted to fire the gas in said cylinders, and an exhaust gas port adapted to receive spent gas from the cylinders, said first gas port, firing means and exhaust gas port being positioned in said rings so that as the rotatable wheel carrying the cylinders thereon revolves the gas port supplies each consecutive cylinder with fresh gas, the end of each cylinder receiving the gas and acting to somewhat compress the same, means for conducting the slightly compressed gas to the firing end of another cylinder, the firing means thereafter firing each consecutive cylinder and the exhaust gas port thereafter receiving the spent gas from each consecutive cylinder.

10. A combustion engine including in combination, a rotatable wheel member having a cylinder mounted on the periphery thereof, a piston in said cylinder, a gas intake port in the wall of said cylinder adapted to be opened and closed by said piston, a stationary valve ring having a primary exhaust recess and an independent secondary exhaust recess, said primary exhaust recess being arranged to receive a part of the spent gas from said cylinder as it passes thereover and when the gas intake port is closed by the piston, and said secondary exhaust port being arranged to receive the remainder of said spent gas as the cylinder passes thereover and when the first gas port in the cylinder is open.

11. A combustion engine including in combination, a rotatable wheel member having a series of cylinders arranged around the periphery thereof, a piston in each cylinder, a gas intake port in the wall of each cylinder adapted to be opened and closed by the piston therein, a stationary valve ring having a primary exhaust recess and an independent secondary exhaust recess, said primary exhaust recess being arranged to receive a part of the spent gas from each of said cylinders as they pass consecutively thereover and when the gas intake port of each cylinder is closed by the piston, and said secondary exhaust port being arranged to receive the remainder of said spent gas as each cylinder passes thereover and when the gas port in said cylinder is open.

12. In an internal combustion engine, a series of rotating cylinders arranged to form a substantial circle, pistons in said cylinders, a shaft extending through the circle, a member mounted on said shaft and being connected to the piston of each cylinder and adapted to be oscillated by the operation of said engine, means for feeding fuel into said cylinders and for exhausting the burned fuel therefrom, part of said exhaust gases acting to ignite the charge in another cylinder, one end of each cylinder acting within a limited space to assist in mixing and to preliminarily compress a charge of the fuel and to discharge substantially all of it into another cylinder for burning therein.

13. In an internal combustion engine including in combination, a rotatable wheel member having a series of cylinders arranged around the periphery thereof, a double acting piston mounted to reciprocate in each of said cylinders, a stationary ring mounted in association with one end of said wheel member and adapted to have said wheel member rotate thereabout, one end of each piston forming with said cylinder a compartment to receive and slightly compress newly introduced gasified fuel from said stationary ring, a conduit connected to the fuel compressing compartment and leading to another cylinder and entering a firing compartment of that cylinder, said conduit conducting the slightly compressed gases to the firing cylinder, each of said pistons having its other end forming the firing compartment with the other end of the cylinder in which it is mounted, a second stationary ring for receiving the exhaust gases from the cylinders, said second stationary ring having a channel for allowing some exhaust gases to pass to a cylinder with compressed gas therein to fire said compressed gases.

14. In an internal combustion engine including in combination, a rotatable wheel member having a series of cylinders arranged around the periphery thereof, a double-acting piston mounted to reciprocate in each of said cylinders, a stationary ring mounted in association with one end of said wheel members and adapted to have said wheel member rotate thereabout, one end of each piston forming with said cylinder a compartment to receive and slightly compress newly introduced gasified fuel from said stationary ring, a conduit connected to the fuel compressing compartment and leading to the next preceding cylinder and entering to the firing compartment of that cylinder, said conduit conducting the slightly compressed gases to the firing cylinder, each of said pistons having its other end forming the firing compartment with the other end of the cylinder in which it is mounted, a second stationary ring for receiving the exhaust gases from the cylinders, said second stationary ring having a channel for allowing some exhaust gases to pass to a cylinder with compressed gas therein to fire said compressed gases.

15. In an internal combustion engine the combination of a supporting frame, a shaft mounted to rotate in said frame, an off-center plate mounted on said shaft, a plurality of cylinders mounted within said frame and adapted to rotate about said shaft, said cylinders being positioned to form a circle, one end of each cylinder being provided with cooling fins over part of its surface, double-acting pistons mounted in said cylinders and connected to said off-center plate, one end of each piston forming with a cylinder a firing compartment, the other end of each piston being hollow and open and forming a compartment with the other end of said cylinder to assist in the mixing of fuel charges and to slightly compress the same, a stationary ring adapted to cooperate with the compressing ends of the cylinders to admit gas to said cylinders, and a second stationary ring mounted at the other end of said cylinders for receiving burned gases therefrom and having a channel for a part of said burned gases to be transferred to cylinders having compressed gases therein to thereby fire said compressed gases, conduits leading from the compression ends of each cylinder to the firing ends of the next preceding cylinders to transmit the mixed and slightly compressed gases to the firing end of the cylinder, means for originally igniting the fuel charge in the cylinders.

16. A combustion engine, including in combination, a plurality of rotating cylinders, a piston in each of said cylinders and adapted to reciprocate therein, one end of each piston adapted to have the fuel charge fired thereagainst, the other end of said piston adapted to form a moving wall of a fuel mixing chamber and in the stroke of said piston to force substantialy all of the mixed fuel from said chamber into the firing chamber of another cylinder.

17. A combustion engine, including in combination, a plurality of rotating cylinders, a piston in each of said cylinders and adapted to reciprocate therein, one end of each piston adapted to have the fuel charge fired thereagainst, the other end of said piston adapted to form a moving wall of a fuel mixing chamber and in the stroke of said piston to force substantially all of the mixed fuel from said chamber into the firing chamber of another cylinder, the fuel delivering piston acting to force the mixed fuel into the receiving chamber of the other cylinder when the piston in the other cylinder is passing through the end of its stroke, and when the exhaust port is closed thereby to cause a super-charging of fuel into the combustion chamber of the other cylinder.

18. A combustion engine, including in combination, a plurality of rotating cylinders, a piston in each of said cylinders and adapted to reciprocate therein, one end of each piston adapted to have the fuel charge fired thereagainst, the other end of said piston adapted to form a moving wall of a fuel mixing chamber and in the stroke of said piston to force substantially all of the mixed fuel from said chamber into the firing chamber of the next preceding cylinder, the fuel delivering piston acting to force mixed fuel into the combustion chamber of the next preceding cylinder when the piston of that cylinder is passing through the end of its stroke and when the exhaust port is closed thereby to cause a super-charging of fuel into the combustion chamber of the next preceding cylinder.

19. A combustion engine including in combination a plurality of rotating cylinders, a piston in each of said cylinders, means for feeding fuel to said cylinders, means for exhausting fuel from each of said cylinders as the piston approaches the end of its explosion stroke and before the opening of the intake port, a means for thereafter separately exhausting each cylinder after the intake port has been opened and incoming fuel is being received in the cylinder.

20. A combustion engine, including in combination, a plurality of cylinders, a piston in each of said cylinders and adapted to reciprocate therein, one end of each piston adapted to have the fuel charge fired thereagainst, the other end of said piston adapted to form a moving wall of a fuel mixing chamber and in the stroke of said piston to force substantially all of the mixed fuel from said chamber into the firing chamber of another cylinder, means for feeding fuel into said cylinders, means for exhausting fuel from each of said cylinders as the piston approaches the end of its explosion stroke and before the opening of the intake port, and means for thereafter separately further exhausting each cylinder after the intake port has been opened and incoming fuel is being received under pressure in the said other cylinder.

THEODORE PRATT.